United States Patent
Gekht et al.

(10) Patent No.: US 10,344,870 B2
(45) Date of Patent: *Jul. 9, 2019

(54) APEX SEAL ARRANGEMENT FOR ROTARY INTERNAL COMBUSTION ENGINE

(75) Inventors: Eugene Gekht, Brossard (CA); Jean Thomassin, Ste-Julie (CA); Sebastien Bolduc, Longueuil (CA); David Gagnon-Martin, Longueuil (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1182 days.

This patent is subject to a terminal disclaimer.

(21) Appl. No.: 13/273,798

(22) Filed: Oct. 14, 2011

(65) Prior Publication Data

US 2013/0028775 A1  Jan. 31, 2013

Related U.S. Application Data

(60) Provisional application No. 61/512,475, filed on Jul. 28, 2011.

(51) Int. Cl.
*F01C 1/22* (2006.01)
*F16J 15/54* (2006.01)
*F01C 19/00* (2006.01)
*F01C 19/02* (2006.01)
*F01C 21/08* (2006.01)

(52) U.S. Cl.
CPC .............. *F16J 15/545* (2013.01); *F01C 1/22* (2013.01); *F01C 19/005* (2013.01); *F01C 19/02* (2013.01); *F01C 21/08* (2013.01)

(58) Field of Classification Search
CPC .......... F01C 19/10; F01C 19/04; F01C 19/02; F02B 2053/005; Y02T 10/17

USPC .......... 123/200, 202, 211; 418/1, 61.1, 61.2, 418/113, 112, 122, 123

See application file for complete search history.

(56) References Cited

U.S. PATENT DOCUMENTS

| 1,922,363 | A | | 8/1933 | Hapkins |
| 2,674,234 | A | | 4/1954 | Riggle |
| 3,064,880 | A | | 11/1962 | Wankel et al. |
| 3,142,440 | A | * | 7/1964 | Otto Schagg ................. 418/61.2 |
| 3,180,564 | A | | 4/1965 | Fuhrmann et al. |
| 3,185,387 | A | * | 5/1965 | Hanns-Dieter Paschke ................. 418/61.2 |
| 3,193,188 | A | | 7/1965 | Bentele |
| 3,194,489 | A | * | 7/1965 | Manfred Frenzel .......... 418/117 |

(Continued)

FOREIGN PATENT DOCUMENTS

| DE | 3519186 | 12/1986 |
| EP | 2497902 | 9/2012 |

(Continued)

*Primary Examiner* — Thai Ba Trieu
(74) *Attorney, Agent, or Firm* — Norton Rose Fulbright Canada L.L.P.

(57) ABSTRACT

In one aspect, described is a rotor for a Wankel engine comprising two circumferentially spaced apart apex seals at each of the apex portions with each apex seal protruding axially from both end faces, and each apex seal having a first biasing member biasing the apex seal radially outwardly away from the peripheral face of the body, and a second biasing member biasing the apex seal axially outwardly away from a respective one of the end faces, the two apex seals of a same one of the apex portions being biased by the respective second biasing member in opposite axial directions from one another.

18 Claims, 6 Drawing Sheets

(56) References Cited

U.S. PATENT DOCUMENTS

| | | |
|---|---|---|
| 3,263,912 A | 8/1966 | Frenzel |
| 3,268,157 A | 8/1966 | Frenzel |
| 3,286,912 A | 11/1966 | Hiroshi |
| 3,556,695 A | 1/1971 | Yamamoto |
| 3,667,877 A | 6/1972 | Lamm |
| 3,685,922 A | 8/1972 | Lamm |
| 3,707,340 A | 12/1972 | Brille |
| 3,761,207 A | 9/1973 | Seidl |
| 3,771,501 A | 11/1973 | DeDobo |
| 3,829,259 A | 8/1974 | Baynes |
| 3,833,320 A | 9/1974 | Telang et al. |
| 3,844,692 A | 10/1974 | McLain |
| 3,849,037 A | 11/1974 | Downs |
| 3,860,365 A | 1/1975 | Bibbens |
| 3,861,838 A * | 1/1975 | Lamm .......................... 418/142 |
| 3,876,346 A | 4/1975 | Kokochak |
| 3,880,555 A | 4/1975 | Dega |
| 3,884,600 A | 5/1975 | Gray |
| 3,890,069 A | 6/1975 | Telang et al. |
| 3,899,272 A | 8/1975 | Pratt |
| 3,909,310 A | 9/1975 | Uy |
| 3,915,600 A | 10/1975 | Lamm |
| 3,920,359 A | 11/1975 | Gray |
| 3,930,767 A | 1/1976 | Hart |
| 3,931,977 A | 1/1976 | Goloff |
| 3,932,075 A | 1/1976 | Jones |
| 3,955,904 A | 5/1976 | Catterson |
| 3,963,388 A | 6/1976 | Goloff |
| 3,981,644 A | 9/1976 | Blum et al. |
| 3,981,688 A | 9/1976 | Telang et al. |
| 4,023,248 A * | 5/1977 | Ozeki et al. ............. 29/888.012 |
| 4,042,312 A | 8/1977 | Betts |
| 4,072,449 A | 2/1978 | Staebler |
| 4,104,011 A | 8/1978 | Ernest |
| 4,317,648 A * | 3/1982 | Shimizu et al. ............... 418/120 |
| 5,144,802 A | 9/1992 | Ruzic |
| 5,181,490 A | 1/1993 | Ruzic |
| 5,410,998 A * | 5/1995 | Paul et al. .................... 123/204 |
| 7,097,436 B2 | 8/2006 | Wells |
| 7,275,919 B2 | 10/2007 | Atkins |
| 7,303,380 B1 | 12/2007 | Atkins |
| 8,597,006 B2 * | 12/2013 | Gekht ..................... F01C 1/22 418/113 |
| 8,967,988 B2 * | 3/2015 | Gekht ..................... F01C 1/22 418/113 |
| 9,850,758 B2 * | 12/2017 | Gekht ..................... F01C 1/22 |
| 2010/0116241 A1 | 5/2010 | Mistry |
| 2012/0227397 A1 | 9/2012 | Willi et al. |
| 2018/0080371 A1 * | 3/2018 | Dussault ................ F02B 53/10 |

FOREIGN PATENT DOCUMENTS

| | | |
|---|---|---|
| JP | 54-055212 | 5/1979 |
| JP | 54-055213 | 5/1979 |
| JP | 55-081205 | 6/1980 |
| JP | 55-101703 | 8/1980 |
| JP | 2000-220401 | 8/2000 |

* cited by examiner

APEX SEAL ARRANGEMENT FOR ROTARY INTERNAL COMBUSTION ENGINE

CROSS-REFERENCE TO RELATED APPLICATION

This application claims priority on provisional U.S. application No. 61/512,475 filed Jul. 28, 2011, the entire contents of which are incorporated by reference herein.

TECHNICAL FIELD

The application relates generally to an internal combustion engine using a rotary design to convert pressure into a rotating motion, more particularly, to sealing arrangements for such an engine.

BACKGROUND OF THE ART

Rotary engines such as the ones known as Wankel engines use the eccentric rotation of a piston to convert pressure into a rotating motion, instead of using reciprocating pistons. In these engines, the rotor includes a number of apex portions which remain in contact with a peripheral wall of the rotor cavity of the engine throughout the rotational motion of the rotor.

The space around the rotor within the rotor cavity defines a number of working chambers which must be sealed from one another in order for the engine to work efficiently. Prior art sealing arrangements typically have gaps between some of the adjacent seal members, which may be due to manufacturing tolerances and/or differential thermal expansions of the seal elements and rotor.

SUMMARY

In one aspect, there is provided a rotor for a Wankel engine comprising a body having two axially spaced apart end faces, and a peripheral face extending between the end faces and defining three circumferentially spaced apex portions, each of the apex portion having two circumferentially spaced apart grooves extending radially inwardly into the rotor body, each groove extending between the end faces, and two circumferentially spaced apart apex seals at each of the apex portions, each apex seal being received in a respective one of the grooves, protruding radially from the peripheral face of the body and protruding axially from both end faces, and each apex seal having a first biasing member biasing the apex seal radially outwardly away from the peripheral face of the body, and a second biasing member biasing the apex seal axially outwardly away from a respective one of the end faces, the two apex seals of a same one of the apex portions being biased by the respective second biasing member in opposite axial directions from one another.

In another aspect, there is provided a rotary internal combustion engine comprising a stator body having an internal cavity defined by two axially spaced apart end walls and a peripheral wall extending between the end walls, the cavity having an epitrochoid shape defining two lobes, a rotor body having two axially spaced apart end faces each extending in proximity of a respective one of the end walls of the stator body, and a peripheral face extending between the end faces and defining three circumferentially spaced apex portions, the rotor body being engaged to an eccentric shaft to rotate within the cavity with each of the apex portions remaining adjacent the peripheral wall, and at each of the apex portions, first and second circumferentially spaced apart apex seals protruding radially from the peripheral face of the rotor body and each protruding axially from both the end faces, the first and second apex seals being radially biased against the peripheral wall, the first apex seal being axially biased against a first one of the end walls, and the second apex seal being axially biased against a second one of the end walls, the first and second apex seals being biased independently from one another.

In a further aspect, there is provided a method of sealing chambers of a Wankel engine between apex portions of a rotor of the engine and a peripheral wall of a rotor cavity of a body of the engine, the method comprising, at each of the apex portions: preventing fluid communication across the peripheral wall by radially pushing first and second circumferentially spaced apart apex seals extending from the rotor against the peripheral wall; limiting fluid communication at a junction between the peripheral wall and a first one of two axially spaced apart end walls of the cavity by contacting one end of the first apex seal with the first end wall and axially pushing the first apex seal against the first end wall, and locating one end of the second apex seal in proximity of the first end wall; and limiting fluid communication at a junction between the peripheral wall and a second one of the two axially spaced apart end walls of the cavity by contacting the other end of the second apex seal with the second end wall and axially pushing the second apex seal independently from the first apex seal against the second end wall, and locating the other end of the first apex seal in proximity of the second end wall

DESCRIPTION OF THE DRAWINGS

Reference is now made to the accompanying figures in which.

DETAILED DESCRIPTION

Figure 1:
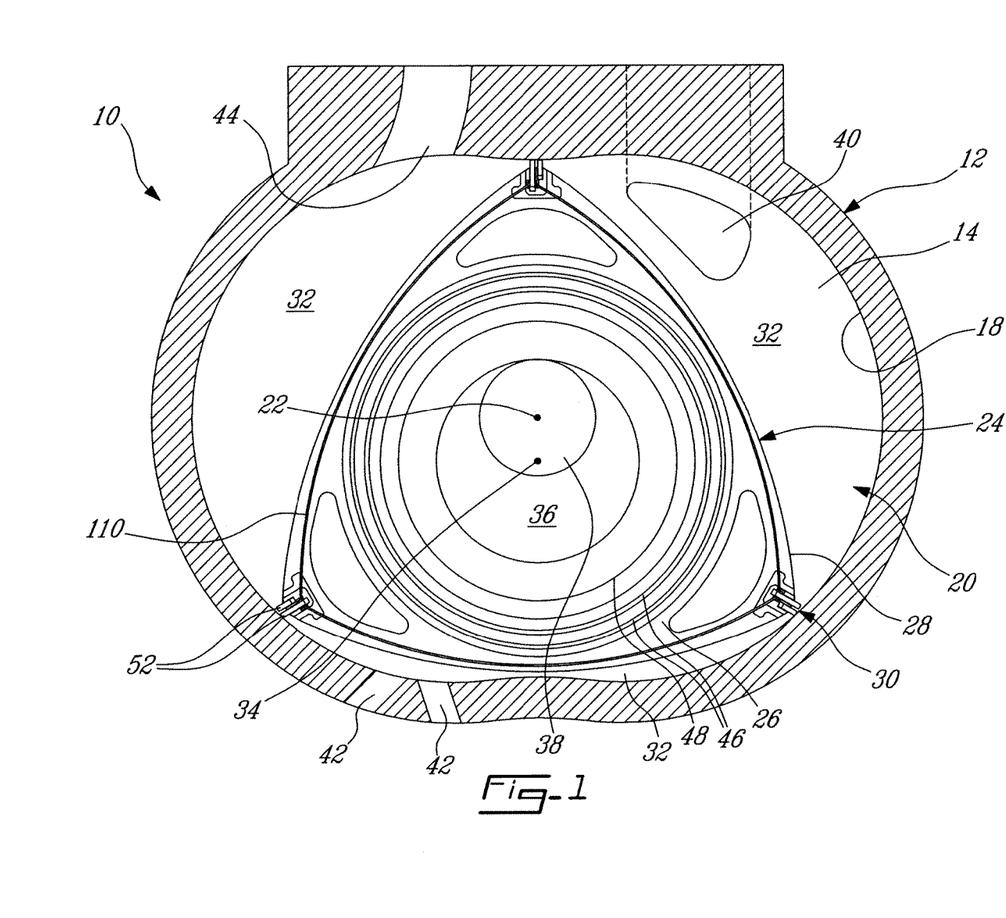
FIG. 1 is a schematic cross-sectional view of a rotary internal combustion engine having a rotor in accordance with one embodiment.

Referring to FIG. 1, a rotary internal combustion engine 10 known as a Wankel engine is schematically shown. The engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides. As will be detailed further below, the apex portions 30 are in sealing engagement with the inner surface of peripheral wall 18 to form three working chambers 32 between the inner rotor 24 and outer body 12. The geometrical axis 34 of the rotor 24 is offset from and parallel to the axis 22 of the outer body 12.

In the embodiment shown, the outer body 12 is stationary while the rotor 24 is journaled on an eccentric portion 36 of a shaft 38, the shaft 38 being co-axial with the geometrical axis 22 of the cavity 20. Upon rotation of the rotor 24 relative to the outer body 12 the working chambers 32 vary in volume. An intake port 40 is provided through one of the end walls 14 for admitting air, or air and fuel, into one of the working chambers 32. Passages 42 for a spark plug or other ignition mechanism, as well as for one or more fuel injectors (not shown) are provided through the peripheral wall 18. An exhaust port 44 is also provided through the peripheral wall 18 for discharge of the exhaust gases from the working chambers 32. Alternately, the exhaust port 44 and/or the passages 42 may be provided through the end wall 14, and/or the intake port 40 may be provided through the peripheral wall 18.

During engine operation the working chambers 32 have a cycle of operation including the four phases of intake, compression, expansion and exhaust, these phases being similar to the strokes in a reciprocating-type internal combustion engine having a four-stroke cycle.

At least one oil seal ring 46 is disposed in a circular groove in each end face 26 of the rotor between the bearing 48 for the rotor 24 on the shaft eccentric 36 and the face seals. Each oil seal 46 impedes leakage flow of lubricating oil radially outwardly thereof between the respective rotor end face 26 and outer body end wall 14. Suitable springs (not shown) are provided for urging each oil seal 46 axially into contact with the adjacent end wall 14 of the outer body 12.

Figure 2:
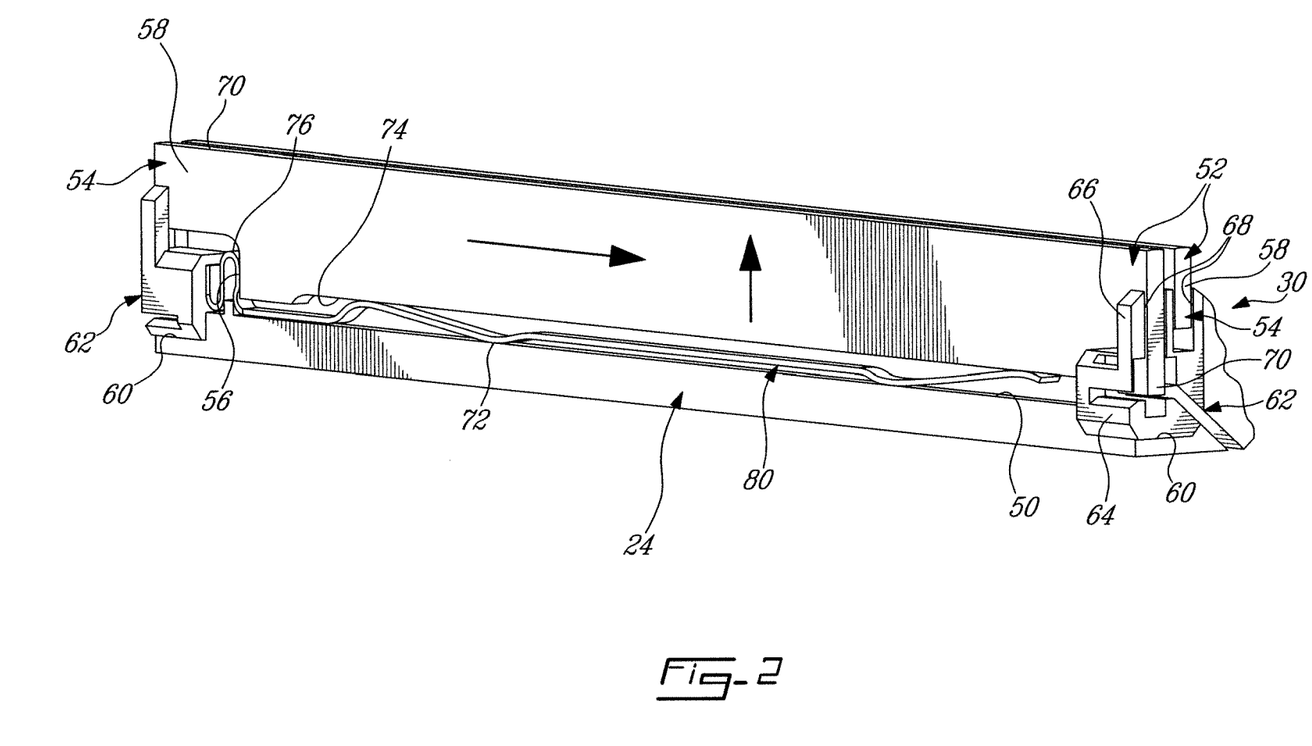
FIG. 2 is a schematic tridimensional view of part of an apex portion of the rotor of the engine of FIG. 1.
Figure 4:
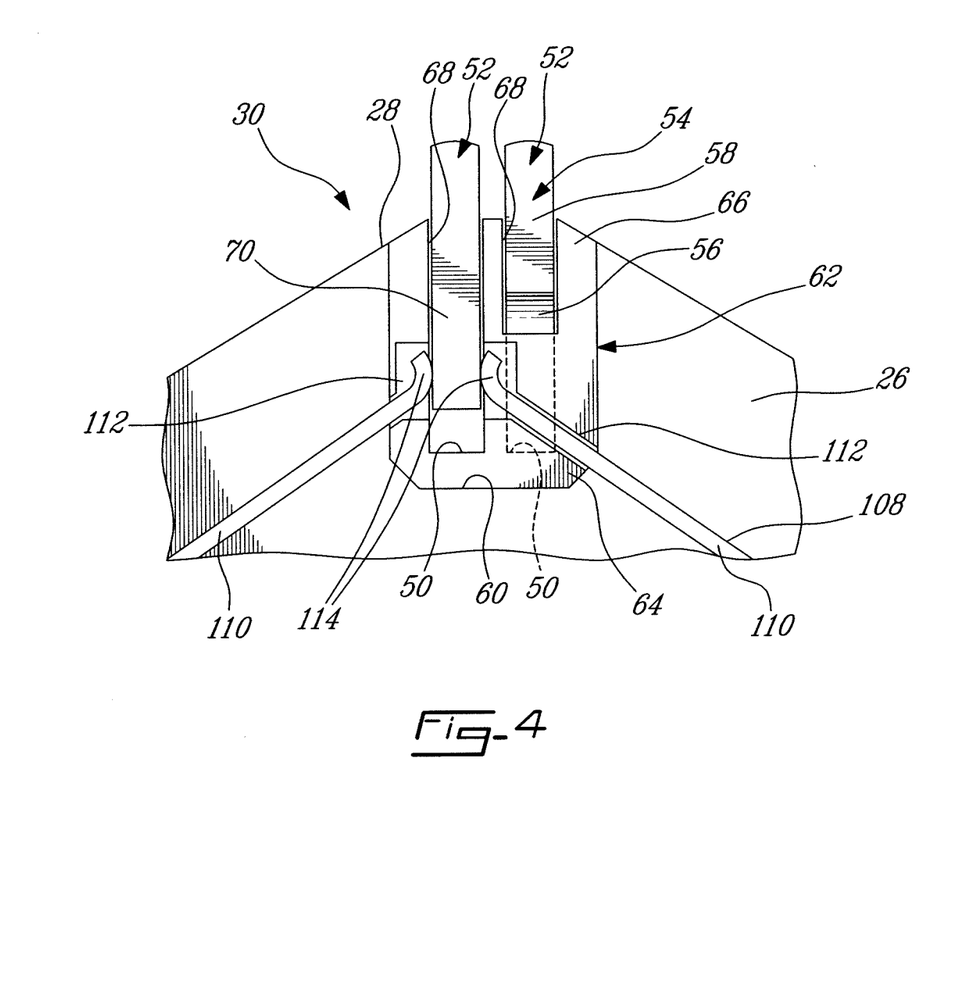
FIG. 4 is a schematic front view of the apex portion of FIG. 2.

The working chambers 32 are sealed by apex seals and face or gas seals. Referring particularly to FIGS. 2 and 4, each rotor apex portion 30 has two circumferentially spaced apart grooves 50 defined therein and extending radially inwardly into the rotor body 24, one on each side of the apex, from one end face 26 to the other. An apex seal 52 is received within each one of the grooves 50, and protrudes radially from the peripheral face 28. Each apex seal 52 in the embodiment shown extends axially beyond both end faces 26, and has an axial dimension which is close to a distance between the two end walls 14 of the cavity 20, taking into consideration such things as the difference in thermal expansion between the material(s) of the outer body 12 and the material of the apex seal 52, which in a particular embodiment is made of a suitable type of ceramic. Although each apex seal 52 is shown has monolithic and including a single seal member, alternately each apex seal may be composed of two or more cooperating seal members.

As shown, each apex seal 52 has a substantially rectangular shape, with a first end 54 having an indentation defined therein from an inner surface thereof. The indentation thus defines a radially extending surface 56 spaced from the first end 54, and the first end defines a finger 58 protruding from that surface 56. The fingers 58 of the two apex seals 52 of the same apex portion 30 are located axially opposite one another.

At each apex portion 30, each end face 26 includes a recess 60 in communication with both grooves 50, and an end plate 62 is received therein and extends radially therefrom. As such, each apex portion 30 includes two axially spaced apart end plates 62. As can be best seen in FIG. 2, each end plate 62 includes a thicker base 64 and a plate member 66 extending radially outwardly from the base 64, with the base 64 and plate member 66 forming a continuous outer surface extending continuously with the corresponding rotor end face 26. Each end plate 62 includes two radial slots 68 defined through the plate member 66 and part of the base 64, each slot 68 being in alignment with a respective one of the grooves 50 (see FIG. 4). Each apex seal 52 has its finger 58 received in the aligned slot 68 of one of the end plates 62, and the opposed second end 70 received in the respective slot 68 of the other end plate 62, such that each of the plates 62 receives one finger 58 and one second end 70. Alternately, the end plates 62 can be replaced by an integral part of the rotor body defining the plate members 66 and slots 68.

Referring to FIG. 2, each groove 50 receives a first biasing member 72, located between the inner surface 74 of the corresponding apex seal 52 and the rotor body 24. The first biasing member 72 pushes the apex seal 52 radially outwardly away from the peripheral face 28 of the rotor 24 and against the peripheral wall 18 of the cavity 20.

Figure 3:
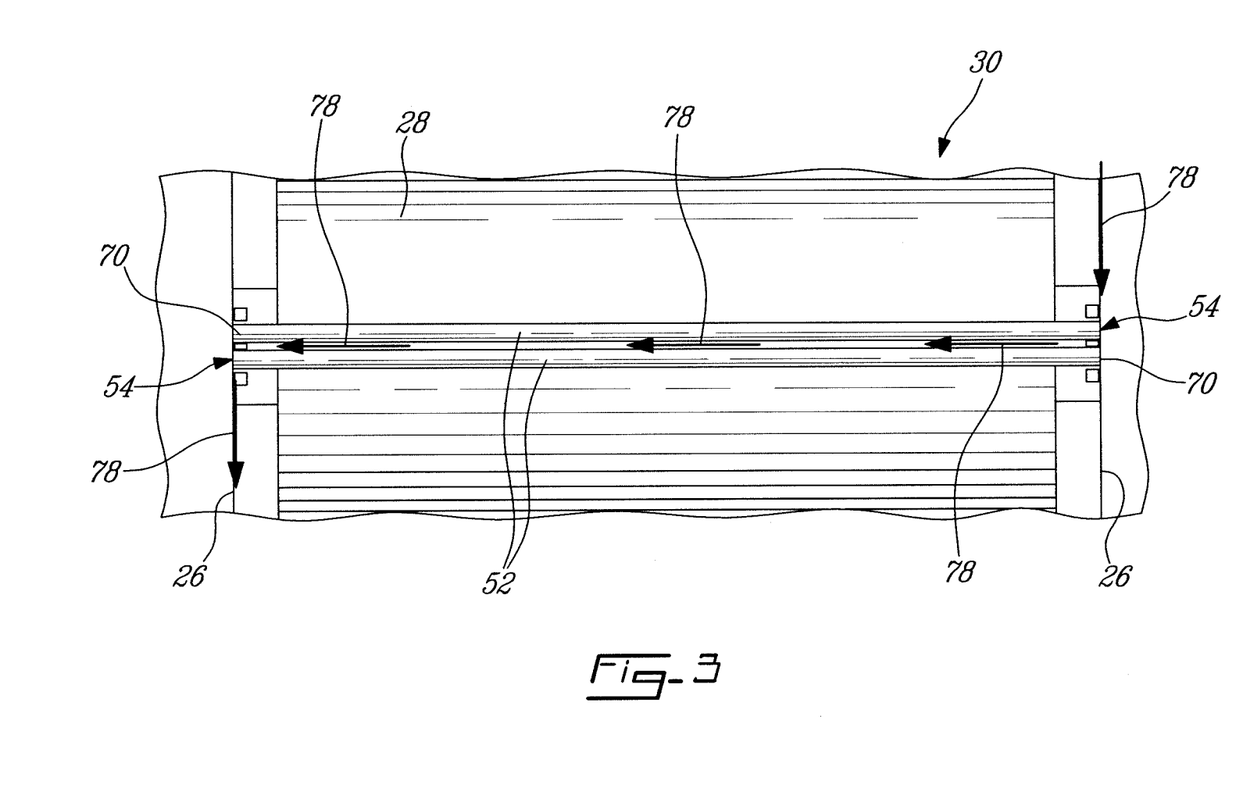
FIG. 3 is a schematic top view of the apex portion of FIG. 2.

Each groove 50 also receives a second biasing member 76 located at the first end 54 of the respective apex seal 52, between the plate member 66 of the adjacent end plate 62 and the radially extending surface 56 defined under the finger 58, pushing the apex seal 52 axially away from that adjacent end plate 62 and thus axially outwardly away from the opposite end face 26 of the rotor 24. The two second biasing members 76 of the same apex portion 30 are in contact with different ones of the end plates 62, and the two apex seals 52 are biased in axially opposite directions, each one against a respective one of the end walls 14. At each apex portion 30, each end wall 14 therefore has one of the apex seals 52 in contact therewith, and the other of the apex seals 52 in close proximity therewith, such as to create a tortuous potential leakage path 78 shown in FIG. 3 which necessitate the escaping flow to travel axially between the two apex seals 52 along the entire apex portion, and as such may help limit fluid communication at the junction between the peripheral wall 18 and each of the end walls 14.

In the embodiment shown, a spring 80 has/includes a first biasing member being a radial action portion 72 and a second biasing member being an axial action portion 76 for each apex seal 52 the a radial action portion 72 is distinct from the axial action portion 76 of the spring 80. Each apex seal 52 is biased independently from the other through its own spring 80.

Figure 5:
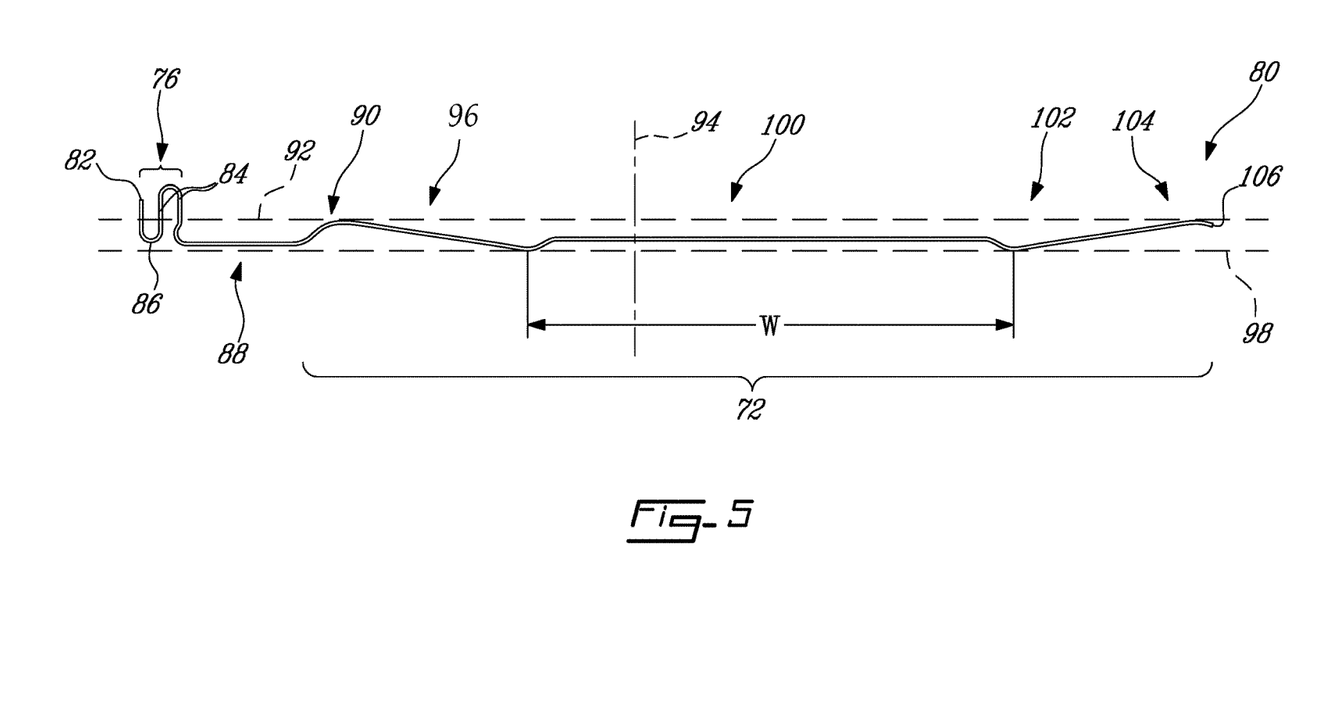
FIG. 5 is a schematic tridimensional view of a spring energizing one of the apex seals of the apex portion of FIG. 2.

Referring to FIG. 5, the spring 80 according to a particular embodiment is shown in isolation. The axial action portion 76 includes a first end 82 of the spring 80 and at least two band sections 84 with adjacent band sections 84 being interconnected by a fold 86. In the embodiment shown, the axial action portion 76 includes three band sections 84. The band sections 84 extend radially and are axially spaced apart from one another. One of the band sections 84 contacts the radially extending surface 56 (see FIG. 2) of the apex seal 52 and another of the band sections 84 contacts a radially extending element of the rotor body, which in the embodiment shown is plate member 66 (see FIG. 2). In a particular embodiment, the axial action portion 76 defines about 5% to 10% of the length of the spring.

The spring 80 is a monolithic band which also includes a longitudinal portion 88 extending axially between the axial action portion 76 and the radial action portion 72. The longitudinal portion 88 is thus connected to the adjacent band section 84 through a fold 86.

The radial action portion 72 forms a major part of the length of the spring 80. The radial action portion 72 contacts the axially extending inner surface 74 of the apex seal 52 (see FIG. 2) in two spaced apart locations, and contacts the bottom surface of the groove 50 between these two locations. In the embodiment shown, the spring includes five successive sections. The first section 90 extends from the longitudinal portion 88 and contacts a first plane 92 defined perpendicularly to the radial direction 94, this first plane 92 corresponding to the inner surface 74 of the apex seal 52. The second section 96 extends from the first section 90 and contacts a second plane 98 parallel to the first plane 92 and radially offset therefrom, which corresponds to the bottom surface of the groove 50. The third section 100 extends axially from the second section 96, and is located between the two planes 92, 98. At least when the spring 80 is in a relaxed state, and in a particular embodiment also when the spring 80 is in a compressed state, the third section 100 extends without contacting the planes 92, 98, i.e. without contacting the apex seal 52 and bottom surface of the groove 50. The fourth section 102 extends from the third section 100 and contacts the second plane 98 or bottom surface of the groove 50. The fifth section 104 extends from the fourth section 102 and contacts the first plane 92 or inner surface 74 of the apex seal 52, and includes the second end 106 of the spring 80.

A distance between the two spaced apart points of contact of the spring 80 with the bottom surface of the groove 50, or between the mid-points of the contact zones if the contact is done along an elongated portion of the surface, defines the wheel base W of the spring. In a particular embodiment, the wheel base W extends along between 55% and 75% of a total length of the radial action portion 72.

In a particular embodiment, the second end 106 of the spring 80 is curved, so that the portions of the spring 80 contacting the apex seal 52 are round to minimize sharp edge contact with the apex seal 52 and as such reduce the risk of damage to the apex seal 52, particularly in cases where the apex seal 52 is made of ceramic. In a particular embodiment, the spring 80 is made of a suitable metal, for example low alloy steel, stainless steel, Ti alloys, and if necessary of a suitable type of super alloy such as, for example, A-286 or Inconell 750.

It can be seen that the axial action portion 76 intersects the first plane 92, in order to extend into the indentation forming the radially extending surface 56 of the apex seal 52.

Referring back to FIG. 4, each end face 26 of the rotor 24 has a plurality of grooves 108 defined therein running from each apex portion 30 to each adjacent apex portion 30, with a face seal 110 being received within each groove 108. In a particular embodiment, each face seal 110 is monolithic. Each end face groove 108 and corresponding face seal 110 are arc-shaped and disposed adjacent to but inwardly of the rotor periphery throughout their length. A spring (not shown) located behind each face seal 110 urges it axially outwardly so that the face seal 110 projects axially away from the adjacent rotor end face 26 into sealing engagement with the adjacent end wall 14 of the cavity.

Each end plate 62 has two openings 112 defined therethrough in continuity with adjacent ones of the grooves 108 of the corresponding end face 26, and each opening 112 receives therein the end of one of the face seals 110. The two ends 114 of each face seal 110 are curled radially outwardly and abut a respective one of the apex seals 52, more particularly the apex seal 52 of each apex portion 30 which is biased against the same one of the end walls 14 as the face seal 110. The ends 114 are curled such as to be able to contact the apex seal 52 without the pointed extremity of the face seal 110 contacting the apex seal 52. The curled ends 114 may reduce the risk of damage to the apex seal 52, particularly in cases where the apex seal 52 is made of ceramic and the face seal 110 is made of metal.

As such, in each apex portion 30, the second end 70 of the apex seal 52 which is biased against a first one of the end walls 14 extends between and is in contact with the curled ends 114 of the two adjacent face seals 110 which are biased against that first end wall 14, and the second end 70 of the apex seal 52 which is biased against the second end wall 14 extends between and is in contact with the curled ends 114 of the two adjacent face seals 110 which are biased against that second end wall 14.

The apex seals 52 limit fluid communication along the peripheral wall 18, and the face seals 110 and apex seals 52 directly cooperate to provide a continuous contact area in sealing engagement with each end wall 14 of the cavity 20. This seal contact area encircles the rotor axis and provides a seal adjacent to the rotor periphery against inward flow of combustion gases between the rotor end faces 26 and the end walls 14. The apex seals 52 and face seals 110 directly cooperate to limit fluid communication along the end walls 14 and near the junction between each end wall 14 and the peripheral wall 18, without the need for an intermediary seal as is typically seen in the art. The elimination of the intermediary seal, seal plug and associated spring may advantageously reduce the number of elements necessary to obtain the desired seal.

Figure 6:
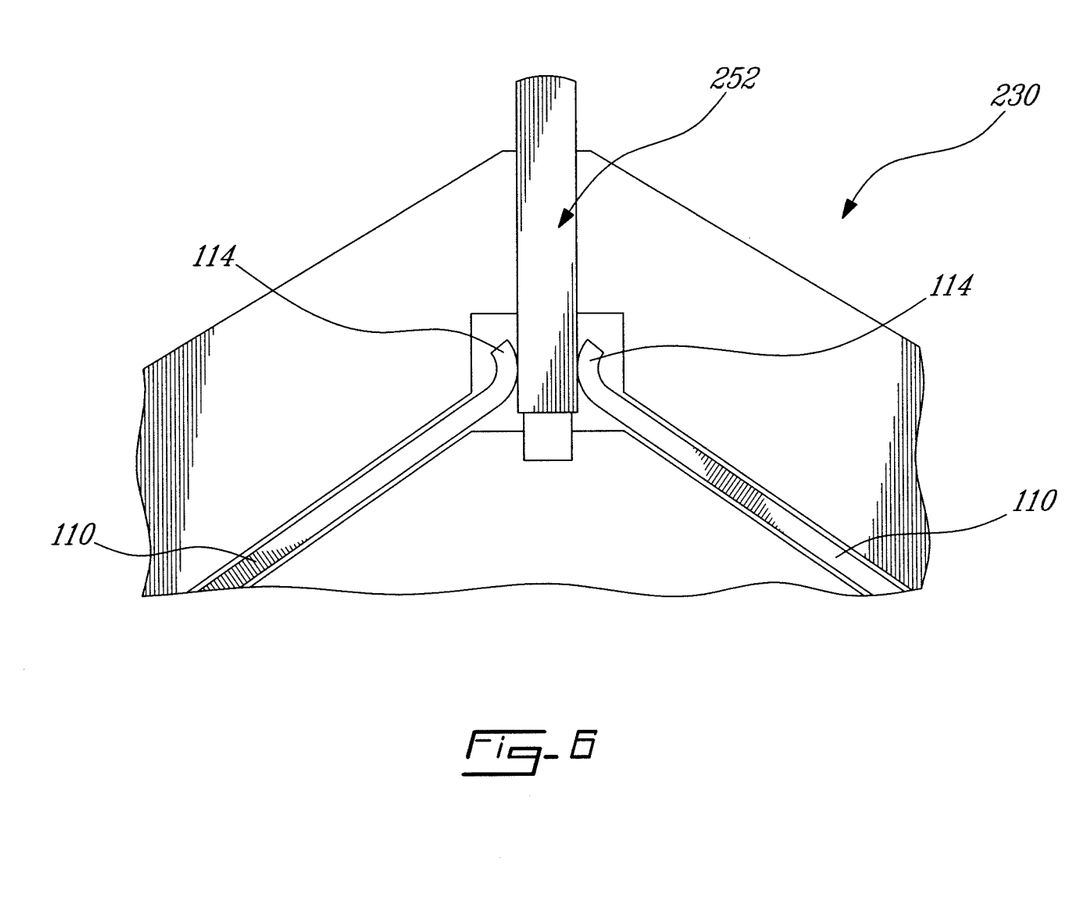
FIG. 6 is a schematic front view of an apex portion in accordance with an alternate embodiment.

Referring to FIG. 6, a sealing assembly according to another embodiment is shown. Here a single apex seal is provided at each of the apex portions 230. The single apex seal 252 includes at least two portions which are biased away from one another such as to contact the opposite end walls 14 of the cavity. Similarly to the previously described embodiment, the curved end 114 of the two face seals 110 extending into each apex portion 230 abut the corresponding sealing element or portion of the apex seal 252 on opposites sides thereof, such as to cooperate to limit fluid communication along the end walls 14 and near the junction between each end wall 14 and the peripheral wall 18.

In another embodiment with is not shown, each apex portion includes more than two circumferentially spaced apart apex seals, with at least one being biased against each of the end walls 14.

The above description is meant to be exemplary only, and one skilled in the art will recognize that changes may be made to the embodiments described without departing from the scope of the invention disclosed. For example, the biasing members need not be springs, per se, but rather any suitable apparatus having the functions described. The configuration of the springs shown are but one example of many possible configurations having the function(s) described. The multiple apex seals at each apex need not be identically configured, but may have any suitable individual configuration. Therefore, modifications which fall within the scope of the present invention will be apparent to those skilled in the art, in light of a review of this disclosure, and such modifications are intended to fall within the appended claims.

The invention claimed is:
1. A rotor for a Wankel engine comprising:
a body having two axially spaced apart end faces, and a peripheral face extending between the two axially spaced apart end faces and defining three circumferentially spaced apex portions, each of the three circumferentially spaced apex portions having two circumferentially spaced apart grooves extending radially inwardly into the rotor body, each of the two circumferentially spaced apart grooves extending between the two axially spaced apart end faces;

the rotor includes two axially spaced apart end plates each
in contact with the peripheral face and extending radially adjacent a respective one of the two axially spaced apart end faces, each of the two axially spaced apart end faces having two slots defined therethrough in alignment with the two the two axially spaced apart end faces grooves; and two circumferentially spaced apart apex seals at each of the apex portions, said each of the two circumferentially spaced apart apex seals being received in a respective one of the two circumferentially spaced apart grooves, protruding radially from the peripheral face of the body and protruding axially from the two axially spaced apart end faces, and at least a portion thereof received in the corresponding slot of a respective one of the end plates; and a spring positioned in said each of the two circumferentially spaced apart apex seals;
wherein the spring further includes:
a respective first biasing member biasing the apex seal radially outwardly away from the peripheral face of the body; and
a respective second biasing member biasing the apex seal axially outwardly away from a respective one of the two axially spaced apart end faces and extending between radial surfaces of the apex seal and of a respective one of the end plates;
wherein the two circumferentially spaced apart apex seals of a same one of the three circumferentially spaced apex portions are biased by the respective second biasing member in opposite axial directions from one another.

2. A rotor for a Wankel engine comprising:
a body having two axially spaced apart end faces, and a peripheral face extending between the two axially spaced apart end faces and defining three circumferentially spaced apex portions, each of the three circumferentially spaced apex portions having two circumferentially spaced apart grooves extending radially inwardly into the rotor body, each of the two circumferentially spaced apart grooves extending between the two axially spaced apart end faces; and two circumferentially spaced apart apex seals at each of the apex portions, said each of the two circumferentially spaced apart apex seals being received in a respective one of the two circumferentially spaced apart grooves, protruding radially from the peripheral face of the body and protruding axially from the two axially spaced apart end faces, and a spring positioned in said each of the two circumferentially spaced apart apex seals;
wherein the spring further includes:
a respective first biasing member being a radial action portion which is in contact with a first surface of the apex seal and pushing the apex seal radially outwardly away from the peripheral face of the body; and
a respective second biasing member being an axial action portion which is in contact with a second surface of the apex seal and pushing the apex seal axially outwardly away from a respective one of the end faces;
wherein the respective first biasing member being a radial action portion is distinct from the second biasing member being an axial action portion of the spring; and wherein the two apex seals of said each of the apex portions are biased by the respective second biasing member being an axial action portion which is in opposite axial directions from one another.

3. The rotor as defined in claim 2, wherein at said each of the apex portions:
the rotor further includes two axially spaced apart end plates;
wherein each of the two axially spaced apart end plates is in contact with the peripheral face and is extending radially adjacent a respective one of the end faces;
wherein said each of the two axially spaced apart end plates has two slots defined therethrough in alignment with the two circumferentially spaced apart grooves; and
each of the two apex seals has opposed ends;
wherein said each of the two apex seals has at least a portion thereof received in the corresponding slot of said each of the two axially spaced apart end plates respectively;
the second biasing member being a axial action portion of the spring for said each of the two apex seals extending between radial surfaces of said each of the two apex seals and of said each of the two axially spaced apart end plates respectively.

4. The rotor as defined in claim 3,
wherein said each of the two apex seals includes an indentation in an end thereof adjacent said each of the two axially spaced apart end plates;
wherein the indentation defines a radially extending surface and an axially protruding finger located radially outwardly from the radially extending surface,
wherein the second biasing member being a axial action portion of the spring extends between the radially extending surface and said each of the two axially spaced apart of the end plates respectively; and
wherein the axially protruding finger is received in the slot of said each of the two axially spaced apart of the end plates respectively.

5. The rotor as defined in claim 2, wherein the two axially spaced apart end faces include first and second end faces, the rotor including first face seals protruding from the first axially spaced apart end face and second face seals protruding from the second axially spaced apart end face, the first and second face seals being biased axially outwardly away from the first axially spaced apart end face and second axially spaced apart end face, respectively, with one of the first face seals and one of the second face seals extending from said each of the three circumferentially spaced apex portions;
said each of the two apex seals biased radially outwardly away from the first end face extending between curled ends of two adjacent ones of the first face seals and being in direct contact therewith, said each of the two apex seals biased radially outwardly away from the second end face extending between curled ends of two adjacent ones of the second face seals and being in direct contact therewith.

6. The rotor as defined in claim 2, wherein said each of the two circumferentially spaced apart two-apex seals is made of ceramic.

7. The rotor as defined in claim 2, wherein said each of the two circumferentially spaced apart apex seals is monolithic.

8. The rotor as defined in claim 2, wherein said each of the two circumferentially spaced apart apex seals has a substantially rectangular shape.

9. The rotor as defined in claim 2, wherein said each of the two circumferentially spaced apart apex seals is made of ceramic.

10. The rotor as defined in claim 2, wherein said each of the two circumferentially spaced apart apex seals is monolithic.

11. The rotor as defined in claim 2, wherein said each of the two circumferentially spaced apart apex seals has a substantially rectangular shape.

12. A rotary internal combustion engine comprising:
a stator body having an internal cavity defined by two axially spaced apart end walls and a peripheral wall extending between the end walls;
wherein the cavity has an epitrochoid shape defining two lobes; and
wherein the peripheral wall has at least an inlet for supplying air and for injecting fuel, an outlet for discharging exhaust gas, and an ignitor;
a rotor body having two axially spaced apart end faces each extending in proximity of a respective one of the end walls of the stator body, and a peripheral face extending between the two axially spaced apart end faces and defining three circumferentially spaced apex portions, the rotor body being engaged to an eccentric shaft to rotate within the cavity with each of the three circumferentially spaced apex portions remaining adjacent the peripheral wall; and
a spring including a first respective spring member and a second respective spring member;
wherein said each of the three circumferentially spaced apex portions includes a first circumferentially spaced apart apex seal and a second circumferentially spaced apart apex seal protruding radially from the peripheral face of the rotor body and each protruding axially from both the two axially spaced apart end faces;
wherein each of the first circumferentially spaced apart apex seal and the second circumferentially spaced apart apex seal has a respective first surface and being radially biased against the peripheral wall by the respective first spring member in contact with the respective first surface;
wherein the first circumferentially spaced apart apex seal is axially biased against a first one of the end walls;
wherein the second circumferentially spaced apart apex seal is axially biased against a second one of the end walls;
wherein the first circumferentially spaced apart apex seal and the second circumferentially spaced apart apex seal are axially biased independently from one another; and
wherein said each of the first circumferentially spaced apart apex seal and the second circumferentially spaced apart apex seal has a respective second surface and is axially biased by the respective second spring member in contact with the respective second surface.

13. The engine as defined in claim 12,
wherein said each of the three circumferentially spaced apex portions of the rotor body further includes
a first end plate abutting the peripheral face and extending radially adjacent the first end wall and having two slots defined therethrough; and
a second end plate abutting the peripheral face and extending radially adjacent the second end wall and having two slots defined therethrough;
wherein each of the two slots of the first end plate and the second end plate is aligned with a corresponding one of two axial grooves defined in the peripheral face receiving a respective one of the first circumferentially spaced apart apex seal and the second circumferentially spaced apart apex seal therein;
wherein the respective second spring member of the first circumferentially spaced apart apex seal extends between the second end plate and the second surface of the first circumferentially spaced apart apex seal; and
wherein the respective second spring member of the second circumferentially spaced apart apex seal extending between the first end plate and the second surface of the second circumferentially spaced apart apex seal.

14. The engine as defined in claim 12,
wherein the rotor includes first face seals protruding from one of the two axially spaced apart end faces and second face seals protruding from the other of the two axially spaced apart end faces, the first and second face seals being biased against the first and second end wall, respectively, with one of the first face seals and one of the second face seals extending from said each of the three circumferentially spaced apex portions;
wherein the first circumferentially spaced apart apex seal extends between curled ends of two adjacent ones of the first face seals and is in direct contact therewith; and
wherein the second circumferentially spaced apart apex seal extends between curled ends of two adjacent ones of the second face seals and is in direct contact therewith.

15. The engine as defined in claim 12, wherein the respective first and second spring members of the spring positioned in said each of the first circumferentially spaced apart apex seal and the second circumferentially spaced apart apex seal have different sections.

16. A method of sealing chambers of a Wankel engine between apex portions of a rotor of the engine, a peripheral wall of a rotor cavity of a body of the engine having at least an inlet for supplying air and for injecting fuel, an outlet for discharging exhaust gas, an ignitor, and an eccentric shaft being engaged to the rotor to rotate within the rotor cavity with three circumferentially spaced apex portions remaining adjacent the peripheral wall, the method comprising:
during an engine operation,
limiting fluid communication across the peripheral wall by radially pushing first and second circumferentially spaced apart apex seals extending from the rotor against the peripheral wall with a respective radial spring member of a spring contacting a respective first surface of each of the first and second apex seals;
limiting fluid communication at a junction between the peripheral wall and a first one of two axially spaced apart end walls of the cavity by contacting one end of the first apex seal with the first end wall and axially pushing the first apex seal against the first end wall with a first axial spring member of the spring contacting a second surface of the first apex seal, and locating one end of the second apex seal in proximity of the first end wall; and limiting fluid communication at a junction between the peripheral wall and a second one of the two axially spaced apart end walls of the cavity by contacting another end of the second apex seal with the second end wall and axially pushing the second apex seal independently from the first apex seal against the second end wall with a second axial spring member of the spring contacting a second surface of the second apex seal, and locating another end of the first apex seal in proximity of the second end wall.

17. The method as defined in claim 16, wherein limiting the fluid communication at the junction between the peripheral wall and the first end wall further includes, at said each of the apex portions, axially pushing two first face seals extending from a first end face of the rotor on opposite sides of the first apex seal against the first end wall and abutting a curled end of each of the first face seals with the first apex seal, and limiting the fluid communication at the junction between the peripheral wall and the second end wall further includes, at said each of the apex portions, axially pushing two second face seals extending from a second end face of the rotor on opposite sides of the second apex seal against the second end wall and abutting a curled end of each of the second face seals with the second apex seal.

18. The method as defined in claim 16, wherein radially pushing and axially pushing the first apex seal are simultaneously performed with the respective radial spring member of the spring at the first apex seal and the first axial spring member of the spring defining distinct sections of a same first spring, and radially pushing and axially pushing the second apex seal are performed simultaneously with the respective radial spring member of the second apex seal and the second axial spring member defining distinct sections of a same second spring.

* * * * *